(12) United States Patent
Samukawa et al.

(10) Patent No.: US 7,271,762 B2
(45) Date of Patent: Sep. 18, 2007

(54) METHOD FOR DETECTING AN OBSTACLE AROUND A VEHICLE

(75) Inventors: Yoshie Samukawa, Kariya (JP); Keiji Matsuoka, Kariya (JP); Hiroshi Ookata, Kariya (JP); Toyohito Nozawa, Kariya (JP)

(73) Assignee: DENSO Corporation, Kariya (JP)

( * ) Notice: Subject to any disclaimer, the term of this patent is extended or adjusted under 35 U.S.C. 154(b) by 209 days.

(21) Appl. No.: 11/043,187

(22) Filed: Jan. 27, 2005

(65) Prior Publication Data

US 2005/0128133 A1 Jun. 16, 2005

Related U.S. Application Data

(62) Division of application No. 10/694,003, filed on Oct. 28, 2003, now Pat. No. 6,903,680.

(30) Foreign Application Priority Data

Nov. 29, 2002 (JP) .............................. 2002-348701

(51) Int. Cl.
*G01S 7/40* (2006.01)
*G01S 13/93* (2006.01)
*G01S 13/00* (2006.01)
(52) U.S. Cl. .......................... 342/173; 342/52; 342/53; 342/54; 342/70; 342/165; 342/175; 342/195; 180/167; 180/169; 356/4.01
(58) Field of Classification Search ...... 356/4.01–5.15; 180/167–169; 342/27, 28, 52–59, 70–72, 342/89–103, 118, 128, 129–133, 165–175, 342/195
See application file for complete search history.

(56) References Cited

U.S. PATENT DOCUMENTS 4,180,816 A * 12/1979 Endo et al. .................... 342/70
4,950,075 A 8/1990 Ichinose et al.

(Continued)

FOREIGN PATENT DOCUMENTS

JP A-5-205191 8/1993

(Continued)

OTHER PUBLICATIONS

Communication from Japanese Patent Office dated Jun. 28, 2005.

*Primary Examiner*—Bernarr E. Gregory
(74) *Attorney, Agent, or Firm*—Posz Law Group, PLC

(57) ABSTRACT

If the maximum time width Lt of the intensity of received light of reflected waves from a vehicle ahead is smaller than a reference time width, it is judged that the vehicle ahead is positioned in proximity to the detection limit distance of an obstacle detection device for vehicle. Thus, there is no problem, for example, even if a cut-in vehicle is present in reality between the vehicle ahead and the vehicle of interest and nevertheless, the distance to the cut-in vehicle cannot be detected. It can be judged whether the vehicle ahead is positioned in proximity to the detection limit distance of the device by judging the magnitude relation between Lt and the reference time width. As a result, the detecting capability of the device can be judged with accuracy.

7 Claims, 11 Drawing Sheets

U.S. PATENT DOCUMENTS

| | | |
|---|---|---|
| 5,235,315 A | 8/1993 | Cherry et al. |
| 5,432,516 A * | 7/1995 | Cherry et al. .................. 342/28 |
| 5,574,463 A | 11/1996 | Shirai et al. |
| 5,627,511 A | 5/1997 | Takagi et al. |
| 5,731,779 A * | 3/1998 | Kikuchi ....................... 342/70 |
| 6,147,637 A | 11/2000 | Morikawa et al. |
| 6,369,747 B1 * | 4/2002 | Ashihara ..................... 342/70 |
| 6,414,628 B1 * | 7/2002 | Ashihara .................... 342/173 |
| 6,445,335 B1 * | 9/2002 | Tamatsu ..................... 342/70 |
| 6,469,659 B1 * | 10/2002 | Lajiness et al. ............. 342/173 |
| 6,611,227 B1 * | 8/2003 | Nebiyeloul-Kifle et al. 342/173 |
| 6,903,680 B2 * | 6/2005 | Samukawa et al. ......... 342/173 |

FOREIGN PATENT DOCUMENTS

| | | |
|---|---|---|
| JP | A-6-109842 | 4/1994 |
| JP | A-7-129900 | 5/1995 |
| JP | A-10-104355 | 4/1998 |
| JP | A-11-109030 | 4/1999 |
| JP | A-2003-302462 | 10/2003 |

* cited by examiner

METHOD FOR DETECTING AN OBSTACLE AROUND A VEHICLE

CROSS REFERENCE TO RELATED APPLICATIONS

This application is a divisional application of U.S. patent application Ser. No. 10/694,003, filed Oct. 28, 2003, now U.S. Pat. No. 6,903,680 B2, which is hereby referenced as corresponding to Japanese Patent Application Number 2002-348701, filed Nov. 29, 2002.

FIELD OF THE INVENTION

The present invention relates to an obstacle detection device for vehicle.

BACKGROUND OF THE INVENTION

Conventionally, there have been various obstacle detection devices for vehicle which detect obstacles around a vehicle. Among them is one that self-diagnoses the detecting capability of the device itself without any inspecting device additionally installed (refer to Patent Document 1: JP-A-11-94946 (U.S. Pat. No. 6,147,637), for example). In detecting capability judgment processing by the obstacle detection device for vehicle disclosed in Patent Document 1, judgment is made as follows: for example, a vehicle ahead (or preceding vehicle) is driving away from a vehicle of interest. The device acquires a distance at which the device becomes incapable of detecting the distance to (lose track of) the vehicle ahead (sight end distance). If the average value of the sight end distances acquired by a predetermine number of times is not more than a predetermined distance, it is judged that the distance detecting capability has degraded.

When it is thereby judged that the device maintains the normal distance detecting capability, various types of control are performed. For example, following distance control (control wherein the distance between the vehicle of interest and the vehicle ahead is kept at a predetermined value) is performed. When it is judged that the device does not maintain the normal distance detecting capability, various measures are taken. For example, control, such as following distance control, is inhibited.

In conventional obstacle detection devices for vehicle, the above-mentioned detecting capability judgment processing is performed as follows: a sight end distance is acquired for the judgment of distance detecting capability where there is no influence of a blind spot. If there is a cut-in vehicle between a vehicle ahead to which the sight end distance is to be detected and the vehicle of interest, a problem arises. The vehicle ahead is hidden behind the cut-in vehicle and cannot be detected (creation of blind spot). The distance at which the vehicle ahead becomes undetectable can be erroneously judged as a sight end distance. To cope with this, the following measure is taken: Overlapping of the vehicle ahead and the cut-in vehicle is checked based on coordinate data indicating the past positional relation between the vehicles in the direction of the width of vehicle. If it is revealed from the result of the check that track of the vehicle ahead has been lost by the cut-in vehicle, detecting capability judgment based on the acquired sight end distance is inhibited.

However, this poses a problem. In the conventional detecting capability judgment processing, judgment is made based on coordinate data which indicates the positional relation between the vehicle ahead and the cut-in vehicle. In other words, the judgment processing is on the precondition that both the vehicle ahead and the cut-in vehicle have been detected. There is a case where a cut-in vehicle is actually present between a vehicle ahead and the vehicle of interest but reflected waves sufficient for distance detection cannot be obtained from the cut-in vehicle because of, for example, dirt on the rear part of the cut-in vehicle. In this case, the distance to the vehicle ahead which has been hidden behind the cut-in vehicle and undetectable is judged as the sight end distance, and the distance detecting capability is judged using this sight end distance.

SUMMARY OF THE INVENTION

The present invention has been made in consideration of the above-mentioned problems. The present invention is intended to provide an obstacle detection device for vehicle wherein detecting capability judgment can be made with accuracy even if the distance to another vehicle present between the vehicle ahead and the vehicle of interest is undetectable.

According to the present invention, an obstacle detection device for vehicle comprises: radar means which radiates transmitted waves around a vehicle and detects reflected waves of the transmitted waves; sensing means which senses a distance to an obstacle around the vehicle based on a result of detection of the reflected waves by the radar means; determining means which determines a limit distance within which sensing by the sensing means is possible; and judging means which compares the limit distance determined by the determining means with a preset sensing reference distance and judges an operating state of the device. The obstacle detection device for vehicle is characterized in that the sensing means comprises signal level judging means which judges a signal level of the reflected waves. The obstacle detection device is also characterized in that the determining means determines the limit distance based on the result of detection of the reflected waves whose signal level is lower than a preset signal level.

As mentioned above, the obstacle detection device for vehicle of the present invention determines limit distances from the result of detection of reflected waves whose signal level is lower than a preset signal level. In case of a radar means using light waves, for example, laser light is radiated (emitted) and reflected waves are reflected by an obstacle. The signal level of the reflected waves (the brightness of light in the form of reflected wave) varies according to the distance to the obstacle. More specifically, when the distance to the obstacle is long, the signal level is low as a rule. When the distance to the obstacle is short, the signal level is high.

Therefore, if a limit distance which can be sensed by the sensing means is detected, it is obvious that the signal level of the detected reflected waves is low. If the signal level is lower than a preset signal level, the limit distance is determined from the result of detection of the reflected waves at that signal level.

Thus, even if any vehicle (a cut-in vehicle) or object is present on this side of a vehicle ahead in reality and is undetectable because of dirt on it or the non-reflectiveness of it, there is no problem. As long as the signal level of reflected waves from the vehicle ahead is equal to or above a preset signal level, the distance to the vehicle ahead is prevented from being judged as a sight start distance or sight end distance. As a result, the detecting capability of the device can be judged with accuracy.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
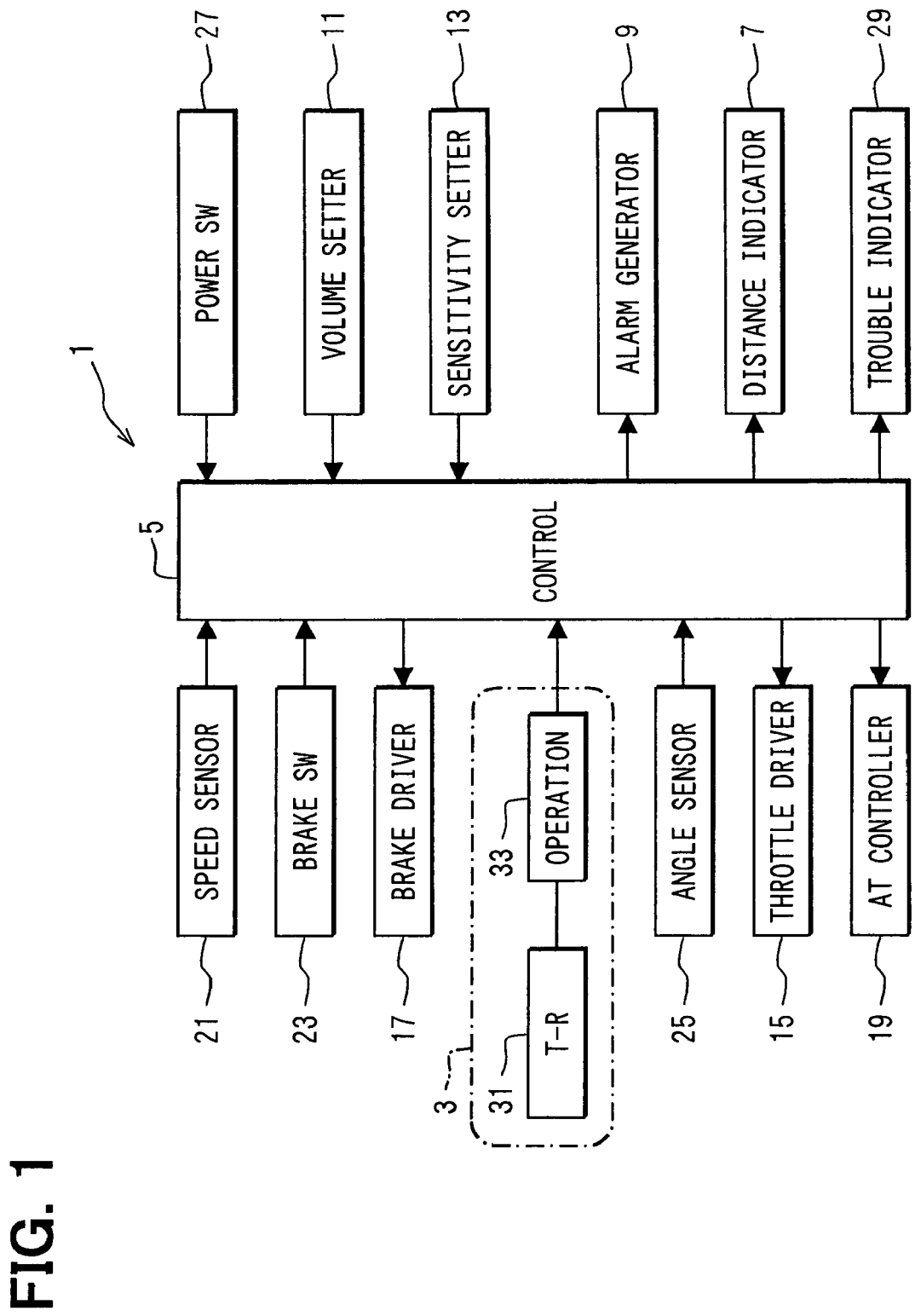
FIG. 1 is a block diagram illustrating the constitution of the vehicle controller 1 in an embodiment of the present invention.

Referring to the drawings, the obstacle detection device for vehicle in the embodiment of the present invention will be described below. In this embodiment, the obstacle to be detected is a vehicle ahead, and detecting capability judgment is made on the obstacle detection device for vehicle based on detection data from the vehicle ahead.

FIG. 1 illustrates the constitution of a vehicle controller to which the obstacle detection device for vehicle in this embodiment is applied. As illustrated in the figure, the vehicle controller 1 detects any vehicle ahead by the scanning distance measuring equipment 3 as a radar means. The vehicle controller 1 performs either or both of two different types of control according to the setting of a mode switch (not shown): rear end collision preventive control and tailing cruising control (following distance control). Under rear end collision preventive control, an audible alarm is generated when the vehicle ahead gets in a predetermined alarming range in front of the vehicle of interest. Under tailing cruising control, the vehicle speed is controlled so as to keep the distance between vehicles at a predetermined value.

As illustrated in the figure, a detection signal from the scanning distance measuring equipment 3 is inputted to an electronic control circuit 5. Based on the inputted detection signal, the electronic control circuit 5 senses the vehicle ahead as described later. Further, the electronic control circuit 5 outputs a driving signal to a distance indicator 7 to indicate the distance between the vehicle of interest and the vehicle ahead.

Further, if the vehicle ahead gets in the alarming range with rear end collision preventive control mode selected, the electronic control circuit 5 outputs a driving signal to an audible alarm generator 9 to generate an audible alarm. The electronic control circuit 5 is connected with an alarm sound volume setter 11 and an alarm sensitivity setter 13. Thus, the sound volume of audible alarm and the alarm sensitivity are settable.

With tailing cruising control mode selected, the electronic control circuit 5 outputs an driving signal also to the following items to control vehicle speed: a throttle driver 15 which drives a throttle valve; a brake driver 17 which drives brakes; and an automatic transmission controller 19 which controls an automatic transmission.

Further, the electronic control circuit 5 is connected with: a vehicle speed sensor 21 which outputs signals corresponding to the vehicle speed; a brake switch 23 which outputs signals corresponding to the operating state of brakes; and a throttle angle sensor 25 which outputs signals corresponding to the opening of the throttle valve. Thus, the electronic control circuit 5 receives data required for varied control.

Further, the electronic control circuit 5 is connected with a power switch 27 which supplies power from a power circuit (not shown) in conjunction with key switch operation. Furthermore, the electronic control circuit 5 outputs a driving signal to a sensor trouble indicator 29 which announces any trouble in the individual sensors 21 to 25.

Figure 2:
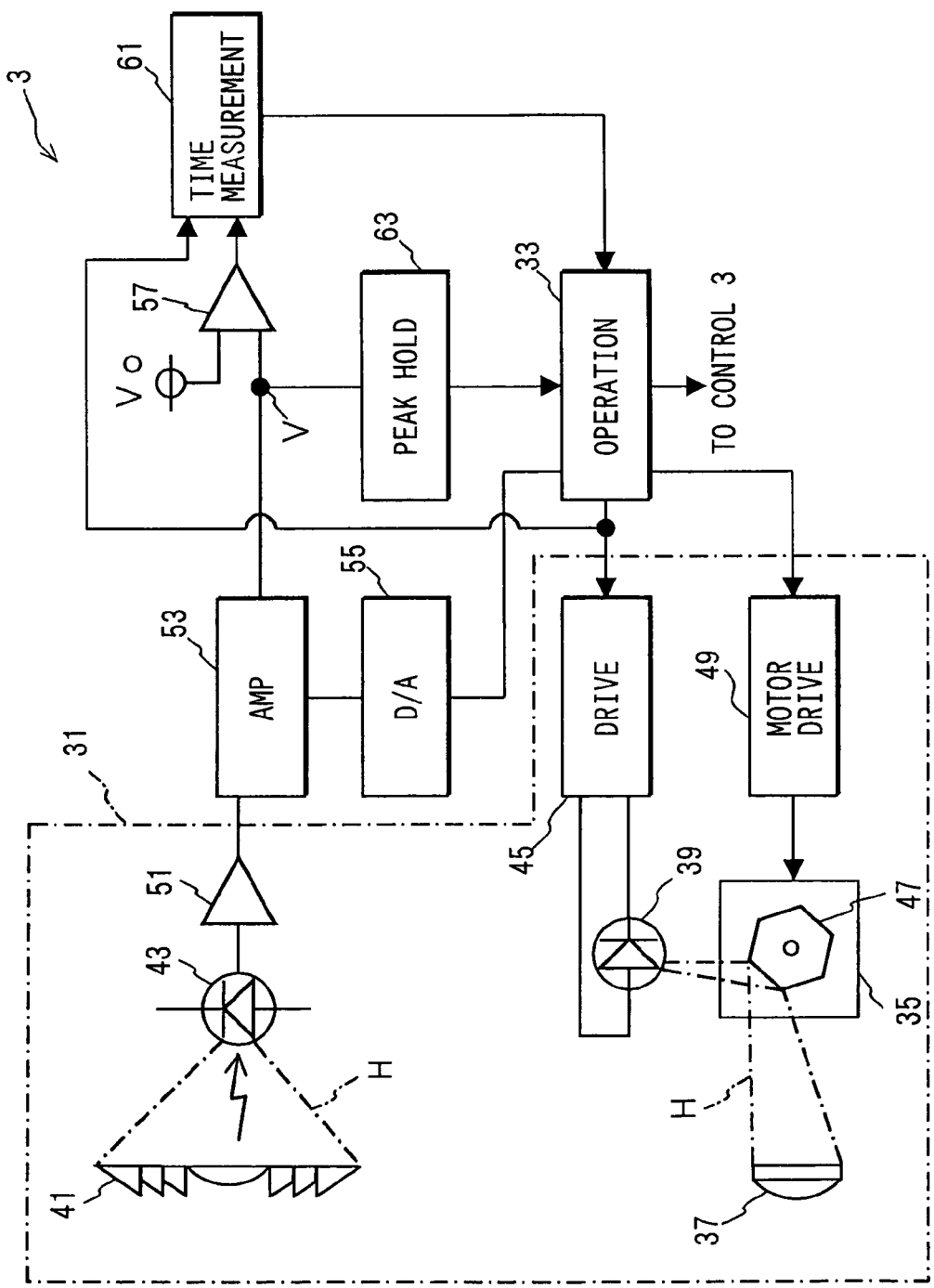
FIG. 2 is a block diagram illustrating the constitution of the scanning distance measuring equipment of the vehicle controller in the embodiment of the present invention.

Next, referring to the block diagram in FIG. 2, the constitution of the scanning distance measuring equipment 3 will be described. As illustrated in FIG. 2, the scanning distance measuring equipment 3 is constituted mainly of a transmission-reception unit 31 and an operation unit 33. The transmission-reception unit 31 includes a semiconductor laser diode (hereinafter, referred to just as "laser diode") 39 which radiates pulsed laser light H through a scan mirror 35 and a light emitting lens 37; and a photoreceptor 43 which receives the laser light H reflected by an obstacle (not shown) and outputs voltage corresponding to the intensity of the received light.

The laser diode 39 is connected with the operation unit 33 through a drive circuit 45, and radiates (emits) laser light H according to a driving signal from the operation unit 33. The scan mirror 35 is provided with a polygonal mirror 47 rotatably installed. When a driving signal is inputted from the operation unit 33 through a motor drive unit 49, the polygonal mirror 47 is rotated by driving force from a motor (not shown). Then, laser light H is sweepingly radiated through a predetermined angle ahead of the vehicle of interest.

The output voltage of the photoreceptor 43 is amplified to a predetermined level through a preamplifier 51, and then inputted to a variable-gain amplifier 53. The variable-gain amplifier 53 is connected with the operation unit 33 through a D-A converter 55. The variable-gain amplifier 53 amplifies input voltage in accordance with a gain specified by the operation unit 33, and outputs the voltage to a comparator 57. The comparator 57 compares the output voltage V of the variable-gain amplifier 53 with a predetermined voltage V0, and inputs a predetermined light reception signal to a time measurement circuit 61 when V>V0.

The time measurement circuit 61 is also fed with the driving signal outputted from the operation unit 33 to the drive circuit 45. The difference in input time between the driving signal and the light reception signal is measured, and the measured value is inputted to the operation unit 33. Based on the input time difference from the time measurement circuit 61 and the rotation angle of the polygonal mirror 47 at that time, the operation unit 33 computes the distance to and the direction of the obstacle. The output voltage V of the variable-gain amplifier 53 is also inputted to a peak hold circuit 63, and the peak hold circuit 63 inputs the maximum value of the output voltage V to the operation unit 33.

Figure 17:
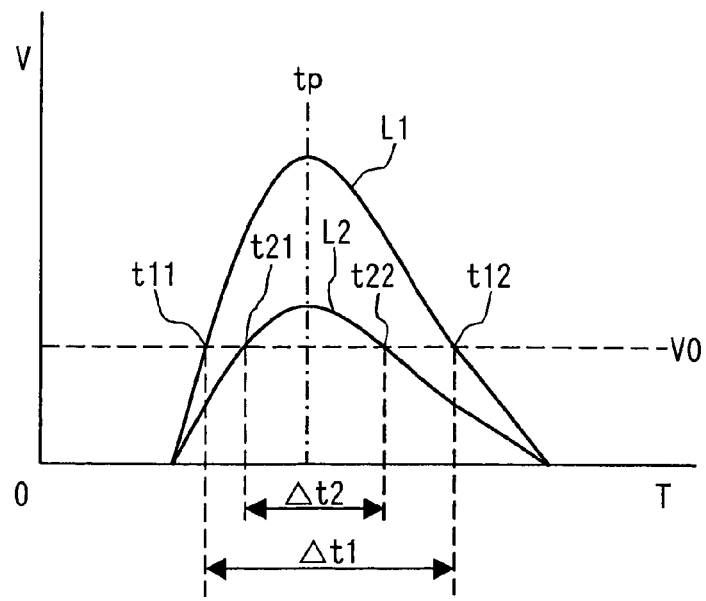
FIG. 17 is a waveform chart of reflected waves illustrating the principle of distance measurement in the embodiment of the present invention.

The thus constituted scanning distance measuring equipment 3 measures distances on the following principle: FIG. 17 is a waveform chart of reflected waves illustrating the principle of distance measurement. The curve L1 corresponds to reflected waves whose intensity of received light is relatively high. The curve L2 corresponds to reflected waves whose intensity of received light is relatively low.

In the figure, it is assumed that a time when the rising curve L1 crosses a predetermined voltage V0 set by the comparator 57 (hereinafter, referred to as "threshold") is t11, a time when the falling curve L1 crosses the threshold V0 is t12, and the time difference between time t11 and time t12 is Δt1. Further, it is assumed that a time when the rising curve L2 crosses the threshold V0 is t21, a time when the falling curve L2 crosses the threshold V0 is t22, and the time difference between time t21 and time t22 is Δt2. The threshold V0 is set for the purpose of preventing the influences of noise components.

As is evident from FIG. 17, when the time difference Δt1 corresponding to intense reflected waves and the time difference Δt2 corresponding to weak reflected waves are compared with each other, a relation expressed as Δt1>Δt2 holds. That is, the magnitude of time differences (Δt1 and Δt2) determined by times (t11, t12, t21, and t22) when the waveform of received reflected waves crosses the threshold V0 corresponds to the intensity of received light. When the intensity of received light is low, the time difference is small (Δt2). When the intensity of received light is high, the time difference is large (Δt1). Therefore, the time differences make an index which characterizes the intensity of received reflected waves. Hereinafter, the time differences will be referred to as time width corresponding to intensity of received light (Δt1, Δt2).

Based on intermediate times in time widths corresponding to intensity of received light (Δt1, Δt2), predetermined correction is performed to compute a time tp when the maximum voltage is reached. Based on the time difference between when the laser diode 39 emits light and a time tp when the maximum voltage is reached, the distance to the obstacle is measured.

The intensity of received light corresponds to the distance to the obstacle as a rule. That is, when the distance to an obstacle is short, reflected waves whose intensity of received light is high are obtained. When the distance to an obstacle is long, reflected waves whose intensity of received light is low are obtained. Hence, when the distance to an obstacle is short, the time width corresponding to intensity of received light tends to be increased. When the distance to an obstacle is long, the time width corresponding to intensity of received light tends to be reduced.

When the operation unit 33 has computed the distance to and the direction of an obstacle as mentioned above, the operation unit 33 inputs the result of the computation (hereinafter, referred to as "two-dimensional distance data") to the electronic control circuit 5. Then, the electronic control circuit 5 performs target sensing processing and detecting capability judgment processing to be described later. In addition to the two-dimensional distance data, the operation unit 33 also inputs to the electronic control circuit 5 time widths corresponding to intensity of received light used in distance computation.

Figure 3:
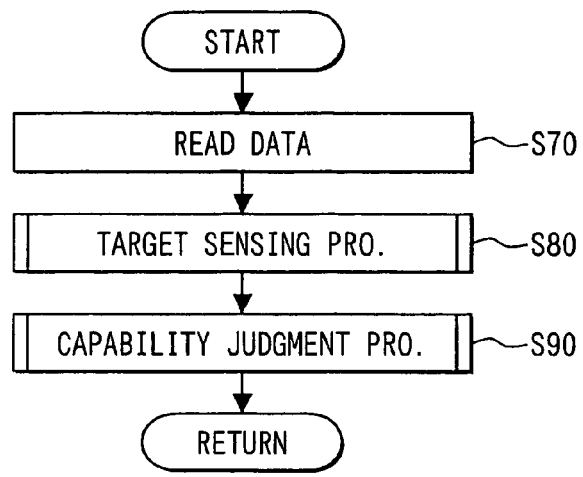
FIG. 3 is a flowchart illustrating the main routine in the embodiment of the present invention.

Next, control processing performed by the electronic control circuit 5 will be described. FIG. 3 is a flowchart illustrating the main routine executed by the electronic control circuit 5. The electronic control circuit 5 executes this processing every 0.1 second. As illustrated in the figure, after the processing is started, two-dimensional distance data and time widths corresponding to intensity of received light are read in at Step 70.

At Step 80, target sensing processing is performed to sense individual vehicles or the like to be sensed as a target. At Step 90, detecting capability judgment processing is performed to judge whether the device is capable of detecting the distance to a target (e.g. vehicle ahead) with accuracy. Then, the processing is terminated once.

Subsequently, target sensing processing at Step 80 will be described. This processing is performed every 0.1 second. Major part of the target sensing processing is the same as target sensing processing in JP-A-H7-318652 (corresponding to U.S. Pat. No. 5,574,463) for which the applicant applied for a patent, and the description of the processing will be simplified.

Figure 4:
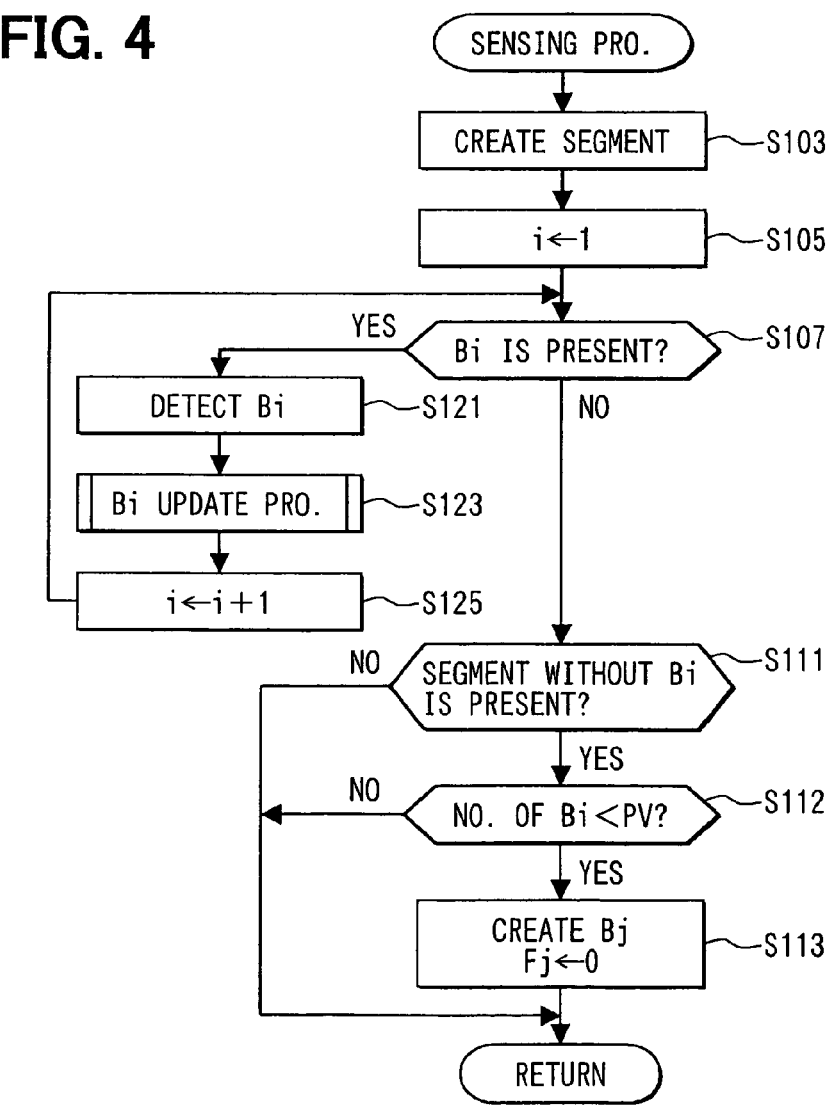
FIG. 4 is a flowchart illustrating target sensing processing in the embodiment of the present invention.

After the processing is started, Step 103 is carried out as illustrated in FIG. 4. At Step 103, based on two-dimensional distance data from the operation unit 33, the position of the obstacle is recognized as discontinuous dots. Of these dots, those that gather adjacently are unified and recognized as a segment (line segment) having only the length in the direction of the width of vehicle. "Gathering adjacently" is defined as a condition that the spacing in the X-axis direction, or the direction of the width of vehicle, is equal to or less than the interval of laser light H radiation and the spacing in the Y-axis direction, or the longitudinal vehicle direction, is less than 3.0 m.

Further, of the dots constituting a segment, one whose time width corresponding to intensity of received light is largest is selected. The selected dot is correlated to the segment as a time width representative of the segment and is temporarily stored.

In the subsequent Step 105, "1" is substituted for a variable i. At Step 107, it is judged whether target Bi is present. Target Bi (i is a natural number) is a model of an obstacle created for each of segments by the processing described later. Since there is no created target Bi at start, negative judgment is made, and the operation proceeds to the subsequent Step 111.

At Step 111, it is judged whether any segment without corresponding target Bi is present. There is no created target Bi at start as mentioned above. Therefore, if segments are recognized at Step 103, all the segments are those having no corresponding target Bi. In this case, affirmative judgment is made, and the operation proceeds to Step 112.

At Step 112, it is judged whether the number of targets Bi is less than a predetermined value (PV). (The predetermined value is a value obtained by adding a margin to the upper limit value of the number of obstacles which emerge within a predetermined angle through which laser light H is sweepingly radiated.) Since the number of targets Bi is less than the predetermined value at start, affirmative judgment is made, and the operation proceeds to Step 113.

At Step 113, target Bj (j=1, 2, . . . ) is created for the individual segments in decreasing order of proximity to the vehicle, and the processing is terminated once. If the total number of targets reaches the predetermined value while target Bj is sequentially created, target Bj is not created any more.

Each target Bj has the following pieces of data: the coordinates of the center (X, Y), width W, relative speeds in X-axis direction and in Y-axis direction VX and VY, status flag Fj, time width corresponding to intensity of received light Ltj representative of the target, and the like.

When target Bj is created, these pieces of data are set as follows: for the coordinates of the center (X, Y) and width W, the coordinates of the center and the width of the segment are used without modification. This is the same with time width corresponding to intensity of received light Ltj. For VX, VY, Fj, and data pieces representing the past eight measurements, the following setting is used: VX=0; VY= (vehicle speed)$^{-1/2}$ (=(vehicle speed) to the power of negative one half); Fj=0; and data pieces representing the past eight measurements are made empty. The status flag Fj is a flag which indicates whether target Bj is in pending status, sensed status, or extrapolated status. (The definition of each status will be described later.) In pending status, Fj=0 is set. When target Bj is created, pending status is set.

Figure 8:
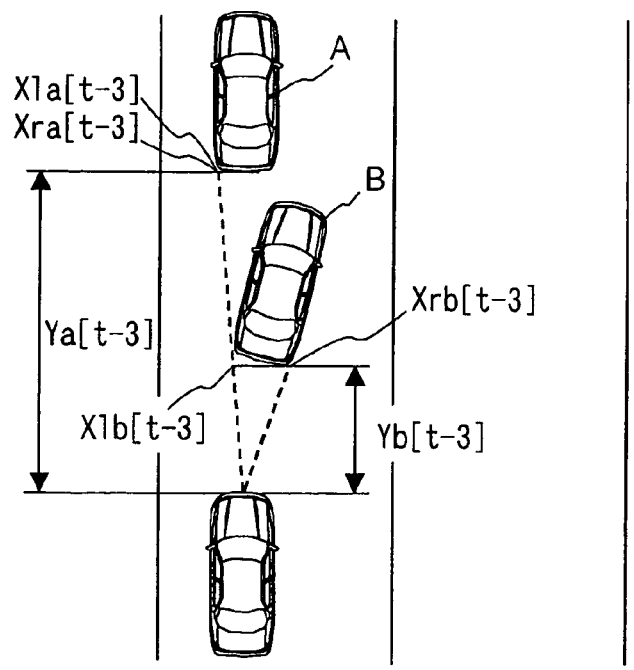
FIG. 8 is an explanatory drawing illustrating the way the vehicle ahead B changes lanes at time [t-3] in the embodiment of the present invention.
Figure 9:
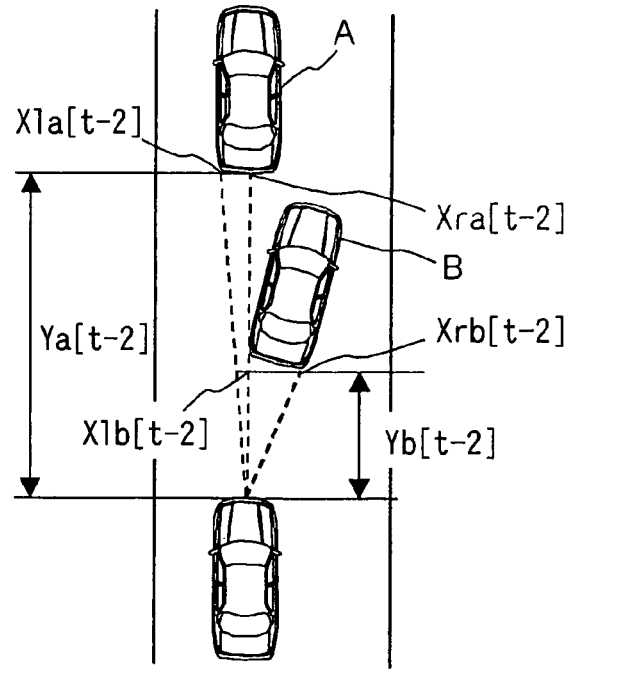
FIG. 9 is an explanatory drawing illustrating the way the vehicle ahead B changes lanes at time [t-2] in the embodiment of the present invention.
Figure 10:
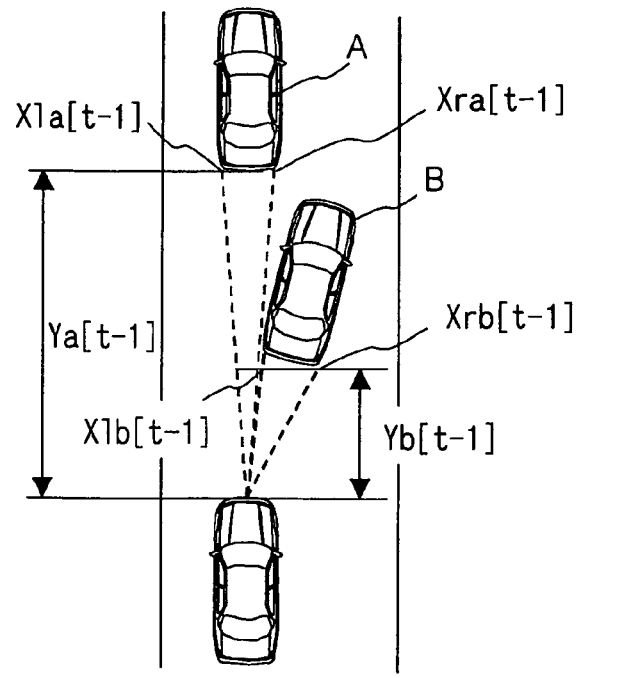
FIG. 10 is an explanatory drawing illustrating the way the vehicle ahead B changes lanes at time [t-1] in the embodiment of the present invention.

If it is judged at Step 107 that the segment relates to target Bi, the operation proceeds to Step 121, and the segment corresponding to the target Bi is detected. The definition of "segment corresponding to target Bi" is found in the description based on FIG. 8 in U.S. Pat. No. 5,574,463. The selecting method for segments is also the same as in the description in connection with FIGS. 9, 10 in the same U.S. patent. Therefore, the description of them will be omitted.

At the subsequent Step 123, target Bi update processing to be described later is performed according to presence/absence of a corresponding segment. At Step 125, "1" is added to the variable i, and then the operation proceeds to Step 107.

Figure 5:
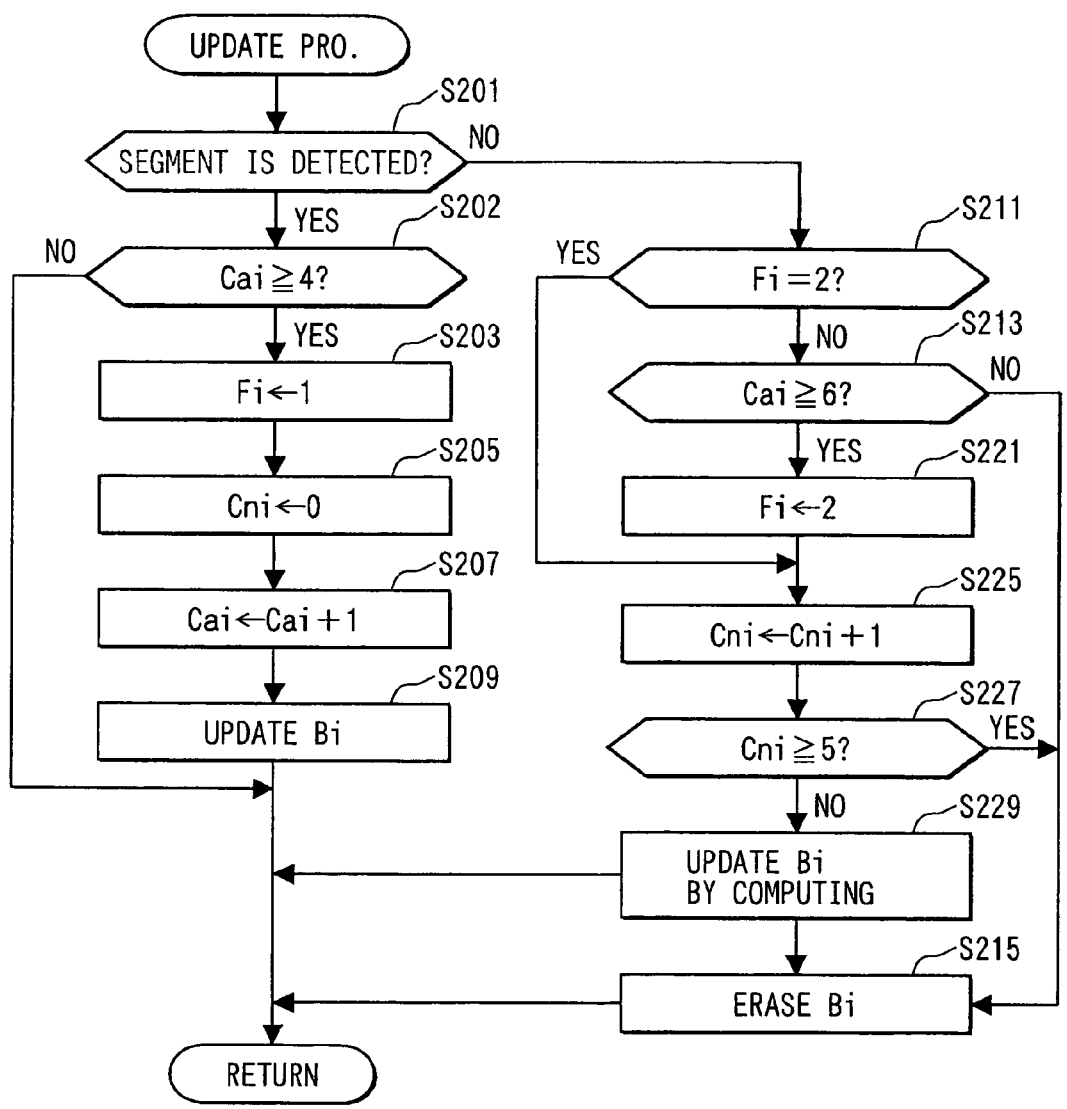
FIG. 5 is a flowchart illustrating target data update processing in the embodiment of the present invention.

Next, target data update processing wherein target Bi is updated will be illustrated in the flowchart in FIG. 5. After the processing is started, it is judged at Step 201 whether a corresponding segment was detected at Step 121. If the segment was detected, it is judged at Step 202 whether the count on a presence counter Cai is 4 or more. The presence counter Cai is incremented when a segment is present.

If the count on the presence counter Cai is less than 4, the processing is once terminated after the present counter Cai which counts times when there is a corresponding segment is present is incremented (not shown). If the count on the presence counter Cai is not less than 4, the operation proceeds to Step 203, and "1" is set on Fi to indicate that target Bi is in sensed status. At Step 205 and Step 207, an absence counter Cni which counts times when there is no segment corresponding to target Bi is reset. Further, the presence counter Cai is incremented.

At the subsequent Step 209, using data of the corresponding segment, the data of target Bi is updated, and then the operation returns to the main routine. This target Bi data update processing will be described in further detail. A corresponding segment as mentioned above has data on the coordinates of the center and the width. It is assumed that these pieces of data are (Xs, Ys) and Ws. Then, the new coordinates of the center and the new width of target Bi are (Xs, Ys) and Ws like the corresponding segment. Further, the time width corresponding to intensity of received light Lti, representative of target Bi, is updated with the maximum time width among the individual segments. The new relative speeds (VX, VY) of target Bi are expressed by the following expression:

$$(VX,\ VY)=((Xs-Xk)/dt,\ (Ys-Yk)/dt) \qquad\text{[Expression 1]}$$

where, (Xk, Yk) is the oldest one of the past center's coordinate data of target Bi (Target Bi has data from up to eight times of measurement in the past); and dt is a time which has passed after the measurement of the center's coordinate data.

If there is no segment corresponding to target Bi at Step 201, the operation proceeds to Step 211. Then, it is judged whether the status flag Fi of the target Bi is set to "2", which indicates extrapolated status. If this is the first time to proceed to this processing, Fi should be 0 or 1. Therefore, negative judgment is made, and the operation proceeds to Step 213.

At this step, it is judged whether the count on presence counter Cai is 6 or more. If Cai is less than 6, the operation proceeds to Step 215. Then, all the data related to target Bi is erased, and the operation returns to the main routine. In other words, as long as a segment corresponding to target Bi is detected, the processing of Steps 201 to 209 is repeated, and the count on the presence counter Cai is gradually increased. If at Step 213, track of target Bi is lost before six cycles have not passed, the data related to the target Bi is erased.

By this processing, data of temporarily detected target Bi can be erased. Thus, unnecessary data of objects on the roadside can be removed, and the obstacle (target Bi) can be sensed with higher accuracy.

If it is judged at Step 213 that Cai is not less than 6, that is, if target Bi is followed for six cycles or longer and then track of it is lost, the operation proceeds to Step 221. Then, it is judged that target Bi is in extrapolated status, and the status flag Fi is set to 2. At the subsequent Step 225, 1 is added to the count on the absence counter Cni.

At the subsequent Step 227, it is judged whether the count on the absence counter Cni has become 5 or more. If the count on the absence counter Cni is less than 5, the operation proceeds to Step 229. Then, the data of target Bi is updated with computed values, and the operation returns to the main routine. That is, it is assumed that the relative speeds (VX, VY) and the width W do not change, and the coordinates of the center (X, Y) of target Bi are computed.

As explained above, if target Bi is followed for six cycles or longer and then track of it is lost, it is judged that the target Bi is in extrapolated status (Fi=2), and the subsequent data of target Bi is updated with computed values (Step 229). At this time, the operation proceeds from Step 221 directly to Step 225, and t the absence counter Cni is gradually incremented. If the count on the absence counter Cni becomes 5 or above, that is, if track of target Bi is lost for 5 successive cycles or longer, the operation proceeds to Step 215, and the data on target Bi is erased.

Because of the above-mentioned processing, even if track of an obstacle (target Bi) which has been followed for six cycles or longer and the presence of which has been confirmed is temporarily lost, there is no problem. If the obstacle is found again (Step 201), track of the obstacle can be followed as the identical obstacle again.

In FIG. 4 back again, when the data of all target Bi (i=1, 2, ...) has been updated by the processing comprising Steps 107, 121, 123, and 125, there is no target Bi corresponding to the incremented variable i remaining at 125. Then, negative judgment is made at Step 107, and the operation proceeds to Step 111 as mentioned above.

If there is a segment which does not correspond to any target Bi (Step 111), new targets Bj in a number within the predetermined value are created for each segment in the processing of Step 112 and the following step (Step 113). Then, the processing is terminated once. If all the segments correspond any target Bi (Step 111), the processing is directly terminated.

By the above-mentioned processing, it can be favorably judged whether an obstacle recognized as a segment is identical with target Bi sensed in the past. Therefore, the relative speeds (VX, VY) of an obstacle corresponding to target Bi relative to the vehicle of interest can be computed with accuracy.

Figure 6:
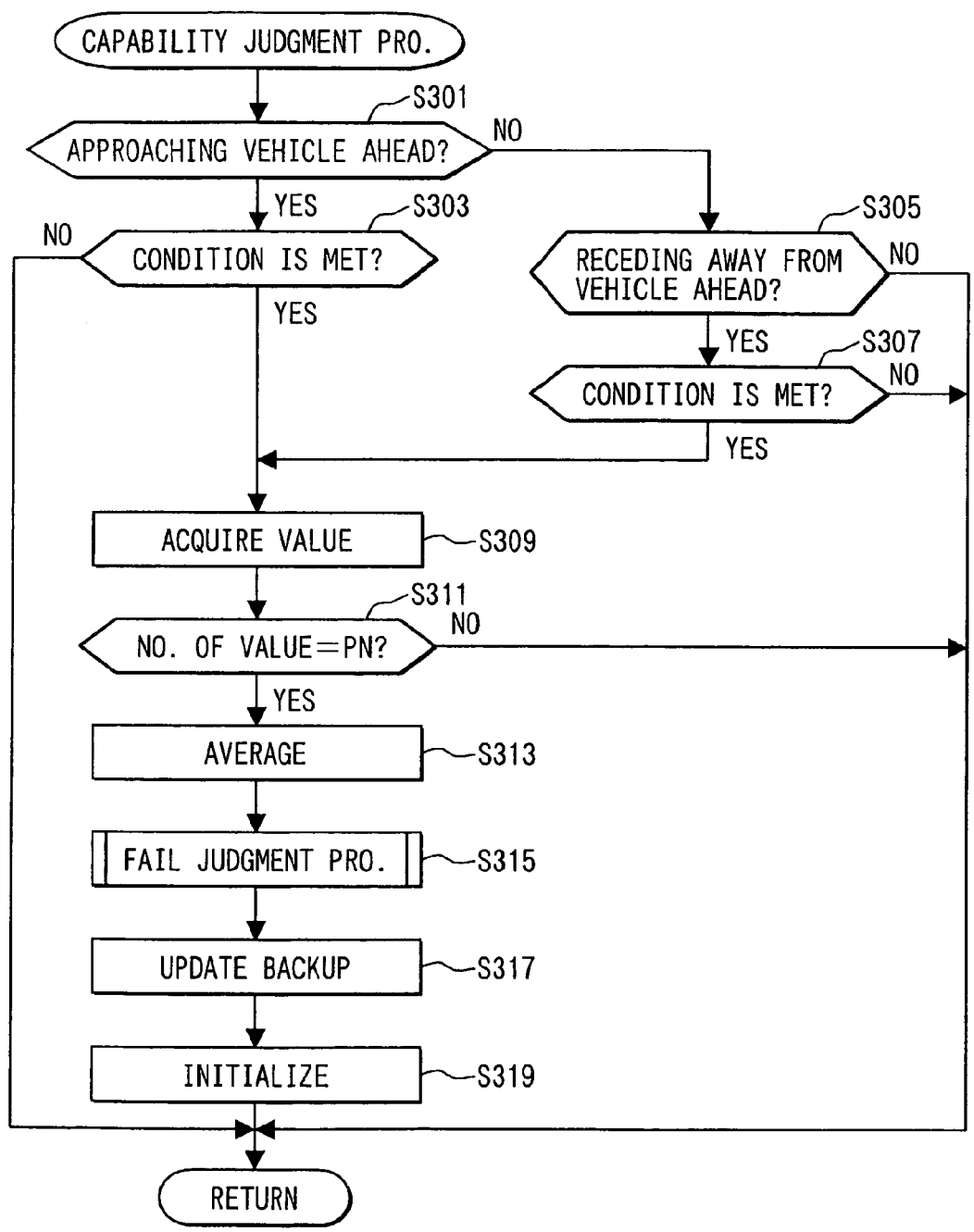
FIG. 6 is a flowchart illustrating detecting capability judgment processing in the embodiment of the present invention.

Next, detecting capability judgment processing performed at Step 90, which is characteristic of this embodiment, will be described referring to the flowchart in FIG. 6. This processing is performed every 0.1 second. At Step 301 in FIG. 6, it is judged whether the vehicle of interest is presently in (a) state in which the vehicle of interest is approaching the vehicle ahead. If affirmative judgment is made here, the operation proceeds to Step 303. If negative judgment is made, the operation proceeds to Step 305.

More specifically, this judgment of (a) is made when the status of the target (vehicle ahead) changes from pending status to sensed status for the first time. That is, the judgment is made when the detection time in pending status becomes at least 0.4 second or above (the target is detected for four successive cycles at a rate of 0.1 second per cycle, for example). Pending status is unstable status soon after the detection of a target is started. Sensed status is status in which the target is being detected with stability.

At Step 303, when the status changes from pending status to sensed status, that is judged as the start of the sight of the vehicle ahead. Therefore, at Step 303, in (a) state in which the vehicle of interest is approaching the vehicle ahead, it is judged whether execution conditions for performing this processing are met. If affirmative judgment is made here, it is judged that the execution conditions for performing this processing are met, and the operation proceeds to Step 309. If negative judgment is made, it is judged that the execution conditions are not met, and the processing is terminated once.

The following criteria (1) to (6) are applicable for the execution conditions for this processing. However, with increase in the number of criteria, the device's accuracy of judgment of the capability to detect the distance between the vehicle of interest and the vehicle ahead (hereinafter, referred to as "detecting capability judgment") is enhanced.

(1) That the vehicle of interest is driving straight. For example, if it is judged based on a signal from a steering angle sensor (not shown) that the turning radius of the vehicle exceeds 3000 m, the vehicle of interest is judged to be driving straight. If the vehicle of interest is considered to be driving around a curve, detecting capability judgment is inhibited. This is because in a curve, track of the vehicle ahead is prone to be lost, and there is a high possibility that any other obstacle is erroneously judged as the vehicle ahead.

(2) That the vehicle speed of the vehicle of interest exceeds 40 kilometers per hour. If the vehicle speed of the vehicle of interest is low, a deviation is prone to be produced between the curvature of the road calculated from data from the steering angle sensor and the actual curvature of the road. Further, there is a high possibility that the situation is unsuitable for detection of sight start distance and the like, like a congested road. Therefore, if the speed is not more than 40 kilometers per hour, detecting capability judgment is inhibited.

(3) That the relative speed (e.g. VY) relative to the vehicle ahead exceeds 5 kilometers per hour. If the relative speed is low, the following distance does not vary so much, and it is difficult to detect a sight start distance or sight end distance. Therefore, if the relative speed is not more than 5 kilometers per hour, detecting capability judgment is inhibited.

(4) That the distance to the target exceeds 10 m. If the distance to the target is not more than 10 m, there is a low possibility that the vehicle ahead is detected, and there is a high possibility of erroneous detection due to turbidity in the space. Therefore, if the distance to the target is not more than 10 m, detecting capability judgment is inhibited.

Figure 7:
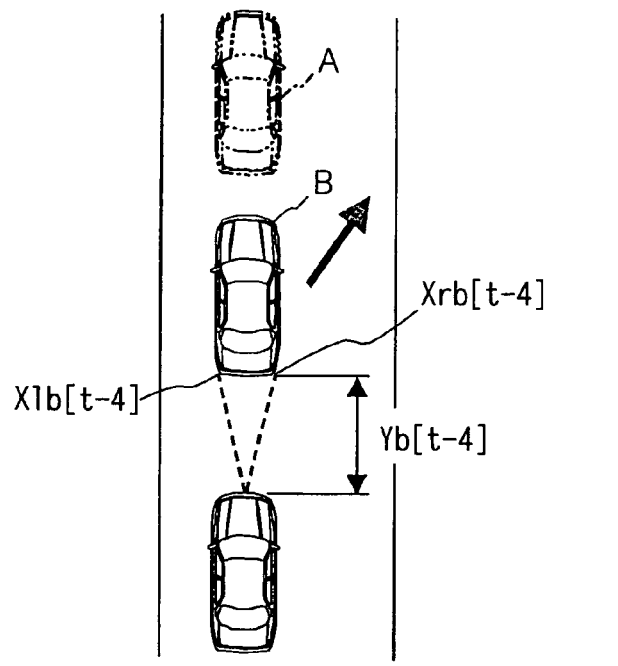
FIG. 7 is an explanatory drawing illustrating the way a vehicle ahead B changes lanes at time [t-4] in the embodiment of the present invention.

(5) That the vehicle ahead or the vehicle of interest is not changing lanes (there is not the influence of a blind spot). It is assumed that there are vehicles ahead A and B within the limit distance, as illustrated in FIG. 7. If the vehicle ahead B changes lanes and get out of the path, the distance to the vehicle ahead A can be erroneously judged as the sight start distance despite the vehicle being within the limit distance. In this case, detecting capability judgment is inhibited.

Figure 11:
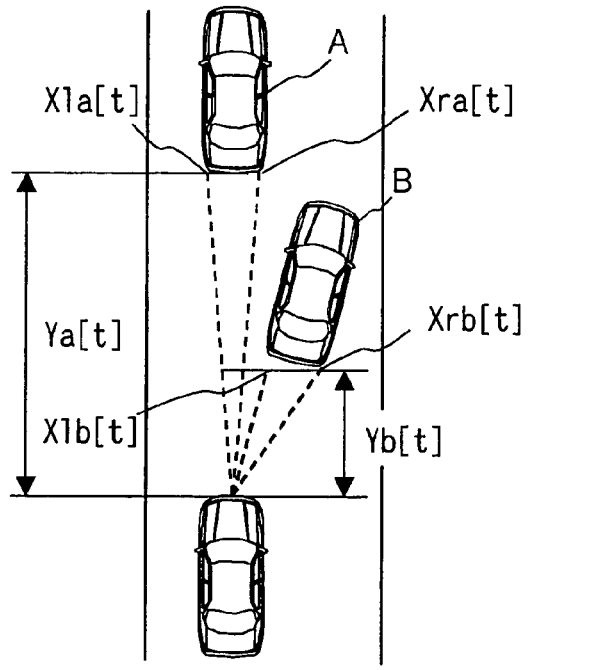
FIG. 11 is an explanatory drawing illustrating the way the vehicle ahead B changes lanes at time [t] in the embodiment of the present invention.

Description will be given more specifically. It is assumed that the vehicle ahead A is detected in sensed status for the first time at time [t] illustrated in FIG. 11. If there is the vehicle ahead B at a closer distance, the following conditions are checked. If it is revealed as a result that there is a target meeting the conditions (the vehicle ahead B is applicable in the figure), it is judged that the vehicle ahead A has appeared from a blind spot produced by the vehicle ahead B. Then, detecting capability judgment is inhibited.

FIG. 7 to FIG. 11 illustrate the positional relation between the vehicles and the like for the period from time [t-4] to time [t]. The following pieces of data are respectively held for up to eight cycles of past measurement: the distance to the vehicle ahead A (Ya), the distance to the vehicle ahead B (Yb), the coordinate of the left end of the vehicle ahead B (Xlb), the coordinate of the right end of the vehicle ahead B (Xrb), the coordinate of the left end of the vehicle ahead A (Xla), and the coordinate of the right end of the vehicle ahead A (Xra).

That is, overlapping is checked between the oldest coordinates of the left and right ends among the pieces of data held with respect to the vehicle ahead B and the coordinates of the left and right ends of the vehicle ahead A at time [t]. If any one of the four conditions listed below is met, detecting capability judgment is inhibited. A sign of "maxpast" indicates the oldest data.

$$Xla[t] \leq Xlb[maxpast] \leq Xra[t] \qquad \text{[Expression 2]}$$

$$Xla[t] \leq Xrb[maxpast] \leq Xra[t] \qquad \text{[Expression 3]}$$

$$Xlb[t] \leq Xla[maxpast] \leq Xrb[t] \qquad \text{[Expression 4]}$$

$$Xlb[t] \leq xra[maxpast] \leq Xrb[t] \qquad \text{[Expression 5]}$$

If any one of the four conditional expression is met, that indicates that the vehicle ahead A and the vehicle ahead B overlapped each other in the same traveling direction in the past. In this case, it is judged that the vehicle ahead B has changed lanes and hence the vehicle ahead A has been sensed. Then, detecting capability judgment is inhibited.

(6) That the maximum time width (Lt) of the intensity of received light correlated with a target (vehicle ahead) is smaller than a reference time width. That is, if the following conditional expression does not hold, detecting capability judgment is inhibited.

Lt<(Reference time width) [Expression]

The processing of Step 303 is performed in (a) state in which the vehicle of interest is approaching (gaining on) the vehicle ahead. The distance at which the vehicle of interest starts to sense the vehicle ahead at this time is equal to the distance at which the vehicle ahead positioned in proximity to the detection limit of the device is sensed for the first time. Then, the time width in which the reflected waves from the vehicle ahead positioned in proximity to the limit distance is over the threshold V0 is short as mentioned above. Therefore, it can be judged whether the vehicle ahead A is positioned in proximity to the limit distance by the following procedure: the time width in which the reflected waves from a vehicle ahead positioned in proximity to the limit distance is over the threshold V0 (reference time width) is determined beforehand by experiments or the like. Then, the magnitude relation between the reference time width and Lt is judged.

Thus, even if a vehicle ahead B is present in reality between the vehicle ahead A and the vehicle of interest and nevertheless, the distance to the vehicle ahead B cannot be detected, that is, even if any conditional expression in the criterion (5) does not hold, there is no problem. If the maximum time width Lt of the intensity of received light of reflected waves from the vehicle ahead A is not less than the reference time width, it can be judged that the vehicle ahead A is positioned on this side short of the detection limit distance of the device. As a result, reflected waves from the vehicle ahead A are prevented from being erroneously used as the limit distance.

If negative judgment is made at Step 301, the operation proceeds to Step 305. At Step 305, it is judged whether the vehicle of interest is presently in (b) state in which the vehicle is receding away from the vehicle ahead. If affirmative judgment is made here, the operation proceeds to Step 307. If negative judgment is made, and the processing is terminated once. More specifically, this judgment of (b) is made when the status of the target (vehicle ahead) changes from sensed status to extrapolated status for the first time. In addition, the judgment is made according to whether the relation expressed as follows holds or not.

The detection time of vehicle ahead>a×(Sight end distance/Relative speed in traveling direction) [Expression 7]

where, the coefficient a is an experimentally determined value (e.g. 0.5). Extrapolated status is status soon after the target (in sensed status) which has been detected with stability becomes undetectable. As mentioned above, the above expression is included in the criteria in addition to the condition that the status changes from sensed status to extrapolated status for the first time. This is to grasp that the vehicle ahead recedes away and, as a result, becomes undetectable (sight end). For example, if the vehicle ahead B traverses the range of detection of the radar located between the vehicle ahead A and the vehicle of interest, the above expression does not often hold.

Therefore, if the conditions including the above expression are met, that is judged as the sight end of the vehicle ahead. If the conditions are not met, detecting capability judgment is inhibited. At Step 307, in (b) state in which the vehicle ahead is receding away, it is judged whether execution conditions for performing this processing are met. If affirmative judgment is made here, it is judged that the execution conditions for performing this processing are met, and the operation proceeds to Step 309. If negative judgment is made, it is judged that execution conditions are not met, and the processing is terminated once.

In addition to the above-mentioned criteria (1) to (4), the following criteria (7) and (8) are added to the execution conditions for this processing.

Figure 12:
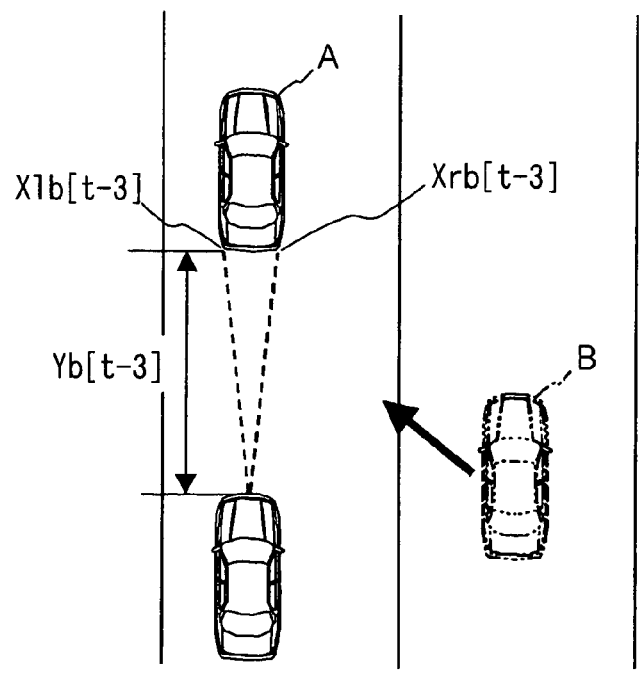
FIG. 12 is an explanatory drawing illustrating the way a vehicle ahead B cuts in at time [t-3] in the embodiment of the present invention.
Figure 13:
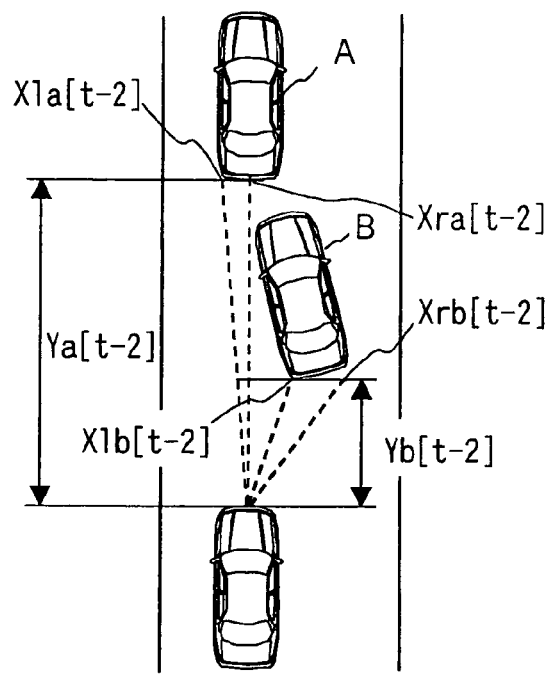
FIG. 13 is an explanatory drawing illustrating the way the vehicle ahead B cuts in at time [t-2] in the embodiment of the present invention.
Figure 14:
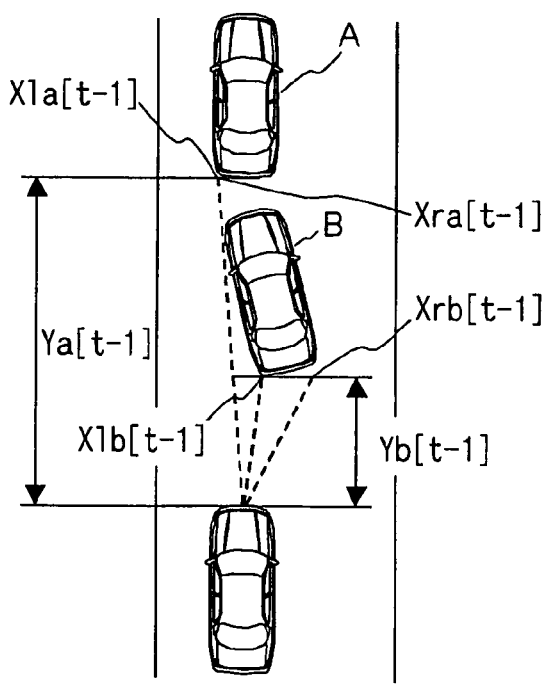
FIG. 14 is an explanatory drawing illustrating the way the vehicle ahead B cuts in at time [t-1] in the embodiment of the present invention.

(7) That there is no cut-in vehicle between the vehicle of interest and the vehicle ahead (there is no influence of a blind spot). For example, it is assumed that the vehicles ahead A and B are present within the limit distance and the vehicle ahead B cuts in and gets into the path, as illustrated in FIG. 12. In this case, the distance to the vehicle ahead A can be erroneously judged as the sight end distance despite the vehicle being within the limit distance. Thus, detecting capability judgment is inhibited.

Figure 15:
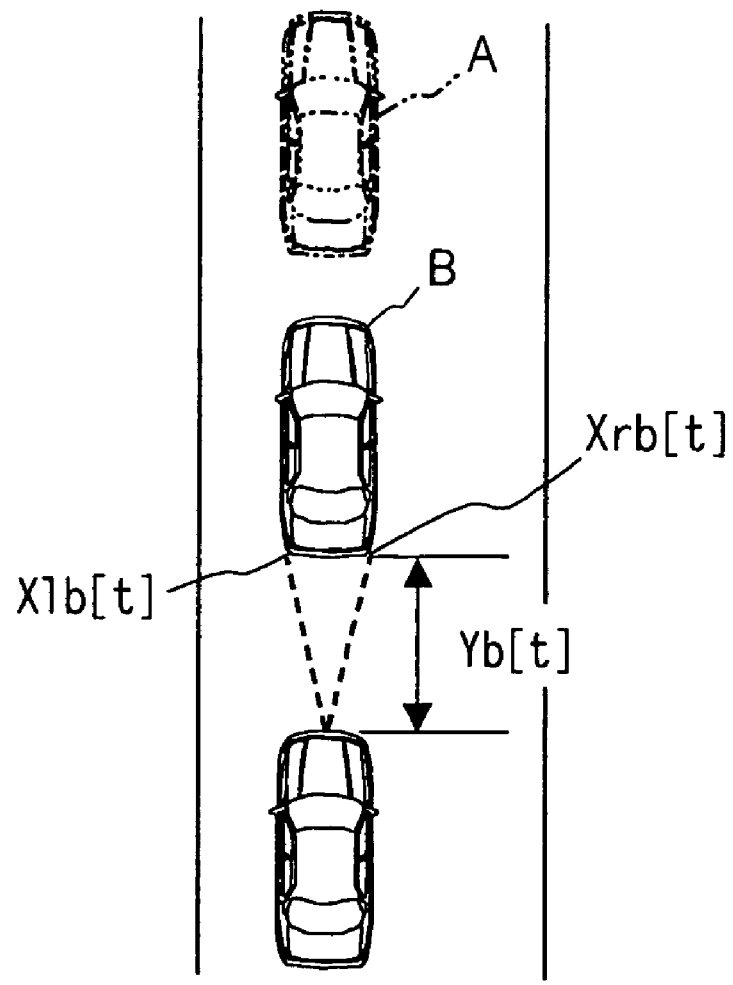
FIG. 15 is an explanatory drawing illustrating the way the vehicle ahead B cuts in at time [t] in the embodiment of the present invention.

Description will be given more specifically. It is assumed that the vehicle ahead A is brought into extrapolated status for the first time at time [t] illustrated in FIG. 15. If there is the vehicle ahead B at a closer distance, the four conditions listed below are checked. If these conditions are met, it is judged that the vehicle ahead A has gotten into the blind spot produced by the vehicle ahead B, and detecting capability judgment is inhibited.

FIG. 12 to FIG. 15 illustrate the positional relation between the vehicles and the like for the period from time [t-3] to time [t]. The following pieces of data are respectively held for up to eight cycles of past measurement: the distance to the vehicle ahead A (Ya), the distance to the vehicle ahead B (Yb), the coordinate of the left end of the vehicle ahead B (Xlb), the coordinate of the right end of the vehicle ahead B (Xrb), the coordinate of the left end of the vehicle ahead A (Xla), and the coordinate of the right end of vehicle ahead A (Xra).

That is, overlapping is checked between the oldest coordinates of the left and right ends among the pieces of data held with respect to the vehicle ahead A and the coordinates of the left and right ends of the vehicle ahead B at time [t]. If any one of the four conditional expressions listed below is met, detecting capability judgment is inhibited.

Xlb[t]≦Xla[maxpast]≦Xrb[t] [Expression 8]

Xlb[t]≦Xra[maxpast]≦Xrb[t] [Expression 9]

Xla[maxpast]≦Xlb[t]≦Xra[maxpast] [Expression 10]

Xla[maxpast]≦Xrb[t]≦Xra[maxpast] [Expression 11]

If any one of the four conditional expressions is met, that indicates that the vehicle ahead B has been detected in proximity to the distance at which the vehicle ahead A was detected. In this case, it is judged that track of the vehicle ahead A has been lost by the vehicle ahead B cutting in. Then, detecting capability judgment is inhibited.

(8) That the maximum time width (Lt) of the intensity of received light correlated with a target (vehicle ahead) is smaller than a reference time width. That is, if the following conditional expression does not hold, detecting capability judgment is inhibited.

Lt<(Reference time width) [Expression 12]

The processing of Step 307 is performed in (b) state in which the vehicle ahead is receding away. The distance at which the vehicle of interest comes to fail to detect the vehicle ahead is equal to the distance at which the vehicle ahead positioned in proximity to the detection limit of the device is detected for the last time. Then, the time width in which the reflected waves from the vehicle positioned at the limit distance is over V0 is short as mentioned above. Therefore, it can be judged whether the vehicle ahead A has been positioned in proximity to the limit distance by the following procedure: the time width in which the reflected waves from a vehicle ahead positioned in proximity to the limit distance is over the threshold V0 (reference time width) is determined beforehand by experiments or the like. Then, the magnitude relation between the reference time width and Lt is judged.

Thus, even if a vehicle ahead B is present in reality between the vehicle ahead A and the vehicle of interest and nevertheless, the distance to the vehicle ahead B cannot be detected, that is, even if any conditional expression in the criterion (7) does not hold, there is no problem. If the maximum time width Lt of the intensity of received light of reflected waves from the vehicle ahead A is not less than the reference time width, it can be judged that the vehicle ahead B is positioned on this side short of the detection limit distance of the device. As a result, reflected waves from the vehicle ahead A are prevented from being erroneously used as the limit distance.

If all the execution conditions for the processing are met in the state of (a) or (b), an instantaneous value of limit distance obtained by detection is acquired at Step 309. That is, the value is read as the first appropriate measured value of following distance.

At Step 311, it is judged whether the thus obtained measured value of limit distance has been acquired by a predetermined number n (PN) of times (for example, n=5). If affirmative judgment is made here, the operation proceeds to Step 313. If negative judgment is made, the operation is terminated once in order to determine the next limit distance in the next cycle of computation in the same manner as mentioned above.

Step 313, averaging is performed to determine a more accurate limit distance without the influence of an error. More specifically, the limit distances acquired by the predetermined number of times are totalized, and the resulting total value is divided by the predetermined number of times to calculate the average value of limit distance. At Step 315, fail judgment processing is performed to judge whether the device's capability to detect distances has actually degraded, as described later.

At Step 317, backup data is updated. More specifically, processing is performed to take the limit distance determined this time as the previous value for the determination of a new limit distance. By this processing, pieces of data are shifted one by one in time series. At Step 319, data for averaging is initialized. More specifically, processing to reset the area for storing the instantaneous values of limit distance, a counter for counting the number of instantaneous values and like, and other processing are performed. Then, the processing is terminated once.

Next, referring to the flowchart in FIG. 16, the fail judgment processing of Step 315 in FIG. 6 will be described. The fail judgment processing is for judging whether the device's detecting capability (for the distance between the vehicle of interest and the vehicle ahead) based on the average value of limit distance determined by averaging at Step 313. In this processing, the start and the end of sight of a vehicle ahead are discriminated from each other, and respective flags are set for them.

Figure 16:
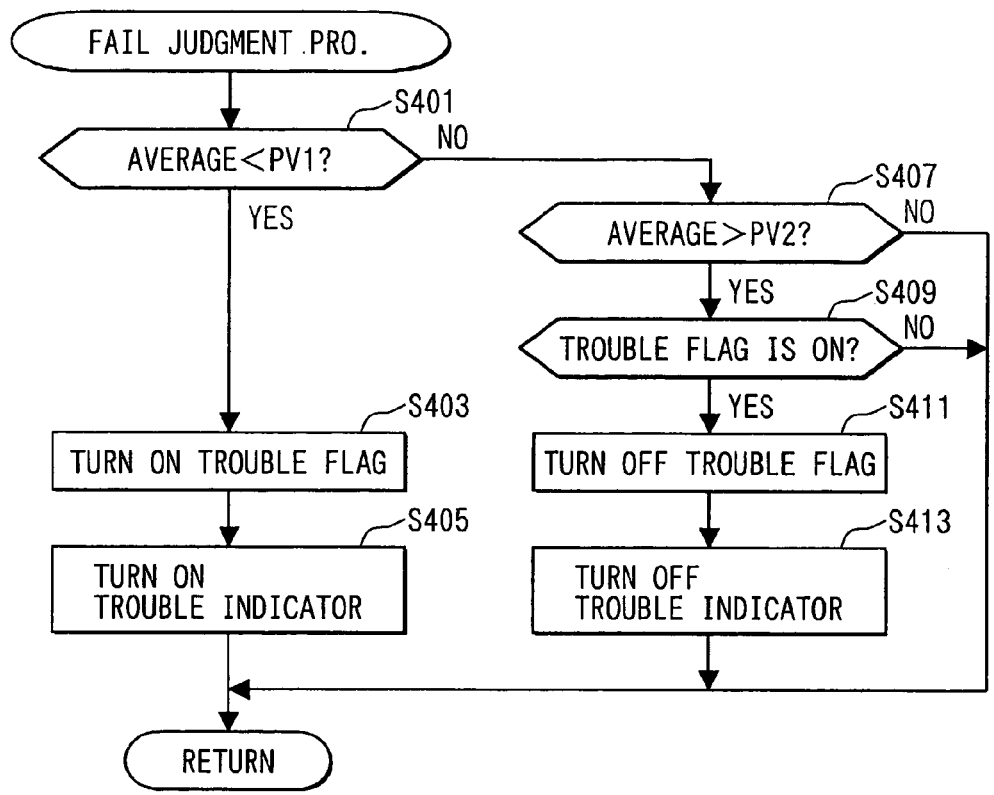
FIG. 16 is an explanatory drawing illustrating fail judgment processing in the embodiment of the present invention.

After the processing is started, judgment is made at Step 401 as illustrated in FIG. 16. The judgment is for deciding whether the average value determined by averaging at Step 313 is less than a predetermined value 1 (PV1) (whether the device's detecting capability has degraded). The predetermined value 1 is a distance (e.g. 50 m) obtained by adding a predetermined margin to the sensing reference distance within which the device in condition is capable of sensing obstacles. If affirmative judgment is made here, the operation proceeds to Step 403. If negative judgment is made, the operation proceeds to Step 407.

At Step 403, a sensor trouble flag is set (turned on) because it has been judged at Step 401 that the detecting capability of the device has degraded. The sensor trouble flag is changed according to the individual situation. That is, a sight end distance fail flag is set for sight end and a sight start distance fail flag is set for sight start. At S405, the driver is informed of that by lighting up (turning on) the sensor trouble indicator 29, and the processing is terminated once.

At Step 407, it is judged whether the average value determined by averaging at Step 307 exceeds a predetermined value 2 (PV2) (e.g. 50 m). This is processing for judging whether the detecting capability of the device has been recovered. In this case, to prevent frequent change to the judgment result (chattering), the predetermined values 1 and 2 are provided with hysteresis.

If negative judgment is made here, it is judged that the detecting capability of the device has not been recovered. Then, the processing is directly terminated once without changing the setting of the sensor trouble flag or the state of the indication. If affirmative judgment is made, the operation proceeds to Step 409. At Step 409, it is judged whether the sensor trouble flag is in the state in which the flag was previously set because it has been judged at Step 407 that the detecting capability of the device has been recovered.

If negative judgment is made here, the processing is terminated once. If affirmative judgment is made, the sensor trouble flag is reset (turned off) at Step 411. At Step 413, the indication on the sensor trouble indicator 29 is put out (turned off), and the processing is terminated once.

In this embodiment, as mentioned above, the limit distance within which the distance to a vehicle ahead can be sensed is detected separately in cases where the vehicle of interest is gaining on the vehicle ahead and in cases where the vehicle ahead is receding away. Further, it is judged whether the intensity of received light at the time of the detection of the limit distance is lower than a preset intensity of received light. Thereby, cases where a vehicle positioned between the vehicle ahead and the vehicle of interest cannot be detected are coped with. Then, the limit distance and a predetermined sensing reference distance are compared with each other. If the limit distance is shorter than the sensing reference distance, it is judged that the device's capability to detect the distance to the vehicle ahead has degraded.

For this reason, degradation in the detecting capability of the device due to various causes can be detected with ease and reliability. Such causes of degradation in the detecting capability of the device include external conditions, such as rainfall, snowfall, and fog, dirt or the like sticking to the light emitting system or light receiving system of the device, and other causes.

That is, according to this embodiment, degradation in the detecting capability of the device, erroneous detection, and the like can be found by self-diagnosis with ease and reliability without any inspecting device additionally installed. Since judgment of degradation in the detecting capability of the device is based on some criteria, the judgment can be made more precisely. The criteria include that the vehicle of interest is driving straight; that the vehicle of interest is driving at a speed equal to or above the predetermined value; that the difference in relative speed between the vehicle of interest and the other vehicle is equal to or above the predetermined value; that there is no cut-in vehicle between the vehicle of interest and the vehicle ahead; that the vehicle of interest or the vehicle ahead is not changing lanes; and that the intensity of received light reflected by the vehicle ahead is equivalent to the intensity of received light obtained when a vehicle ahead positioned in proximity to the detection limit distance of the device is detected.

Further, in the above embodiment, obstacles are detected by radiating pulsed laser light H by the semiconductor laser diode 39. However, any other constitution wherein radio waves, ultrasonic waves, or the like are used may be employed. In this case, the same action and effects as in the above embodiment are obtained. That is, appropriate transmitted waves can be selected according to the intended use of the scanning distance measuring equipment 3.

Furthermore, a reference time width can be set as follows. For instance, when the device has in condition a detection limit distance of 150 m ahead, a reference time width is set as corresponding to an obstacle being 120 m ahead. Thus, even if a vehicle ahead B cuts in between the vehicle ahead A and the vehicle of interest within a 120 m distance from the vehicle of interest, there is no problem. If the maximum time width Lt of the intensity of received light of reflected waves from the vehicle ahead A is not less than the reference time width, it can be judged that the vehicle ahead A is positioned on this side short of the detection limit distance of the device, namely at most 120 m ahead. As a result, reflected waves from the vehicle ahead A are prevented from being erroneously used as the limit distance.

Modification

In the above embodiment, time differences determined by two times at which curves corresponding to the intensity of received light cross a threshold V0 are employed as an index which characterizes the intensity of received light. However, the applicable index is not limited to this. As mentioned above, the intensity of received light is converted into a voltage value corresponding to the intensity. Therefore, for example, the maximum voltage value of reflected waves may be employed as an index which characterizes the intensity of received light. The reflected waves whose intensity of received light is high is shorter in time from when the waves are received to when the threshold V0 is reached as compared with the reflected waves whose intensity of received light is low. Therefore, the time from when the waves are received to when the threshold V0 is reached may be employed as an index which characterizes the intensity of received light. Further, a threshold voltage V1 higher than the threshold V0 may be provided, and time differences determined by two times at which curves corresponding to the intensity of received light cross V1 may be employed as an index which characterizes the intensity of received light.

It will be obvious to those skilled in the art that various changes may be made in the above-described embodiments of the present invention. However, the scope of the present invention should be determined by the following claims.

What is claimed is:

1. A method for detecting an obstacle around a vehicle, comprising the steps of:
    radiating transmitted waves outside the vehicle, the transmitted waves being radiated by a radar;
    detecting reflected waves of the transmitted waves, the reflected waves being detected by the radar;
    sensing a distance to an obstacle around the vehicle based on a result of detection of the reflected waves by the radar, including judging a signal level of the reflected waves;
    determining a limit distance within which the distance can be sensed, wherein the determining step determines the limit distance based on certain waves of the detected reflected waves, the certain waves having the signal level lower than a preset level; and
    comparing the limit distance determined by the determining step with a preset sensing reference distance, and thereby determining whether the obstacle can be detected.

2. The obstacle detection method according to claim 1,
    wherein the transmitted waves are light waves,
    wherein the signal level is judged by judging a time width in which a voltage value corresponding to an intensity of light in the reflected waves is over a predetermined value, and
    wherein the limit distance is determined based on a result of detection of reflected waves whose time width is smaller than a preset reference time width.

3. The obstacle detection method according to claim 2,
    further comprising presetting as the preset reference time width, a time width in which a voltage value corresponding to an intensity of light in given reflected waves is over the predetermined value, wherein the given reflected waves are reflected by an obstacle positioned in proximity to the limit distance.

4. The obstacle detection method according to claim 2,
    wherein the sensing step includes recognizing a position of an obstacle as a segment formed of unified dots that gather adjacently, wherein the segment of unified dots are a subset of discontinuous dots that are obtained based on a result of detection of reflected waves, and
    wherein the determining step determines the limit distance based on a result of detection of reflected waves of a given dot included in the segment, wherein the given dot has a time width in which the predetermined value is exceeded is largest among the dots included in the segment.

5. The obstacle detection method according to claim 1,
    further comprising judging that the operating state has degraded when the limit distance becomes less than the preset sensing reference distance.

6. The obstacle detection method according to claim 1,
    wherein, when the sensing step continuously senses a given obstacle for a predetermined time or longer after the sensing step senses the given obstacle for a first time, the determining step determines the limit distance based on a distance at which the sensing step senses the given obstacle for the first time.

7. The obstacle detection method according to claim 1,
    wherein, when the sensing step continuously senses a certain obstacle for a predetermined time or longer and then becomes incapable of sensing the certain obstacle, the determining step determines the limit distance based on a distance at which the sensing step becomes incapable of sensing the certain obstacle.

* * * * *